United States Patent [19]

Hurst

[11] 4,416,064

[45] Nov. 22, 1983

[54] LADDER BAR DIAL

[76] Inventor: Roger W. Hurst, Box 124, Hartford, Ky. 42347

[21] Appl. No.: 394,004

[22] Filed: Jun. 30, 1982

[51] Int. Cl.³ .............................................. G01B 5/00
[52] U.S. Cl. ............................ 33/181 AT; 33/174 R; 33/180 AT
[58] Field of Search ....... 33/181 AT, 180 AT, 180 A, 33/181 R, 203, 203.15, 203.16–203.18, 203.19, 203.20, 286, 288, 174 R; 116/28 R, 34 R, 35 R, 37, 56

[56] References Cited

U.S. PATENT DOCUMENTS

| 353,888 | 1/1851 | Schumann | 116/28 R |
| 2,972,189 | 2/1961 | Houlub | 33/203.2 |
| 3,487,551 | 1/1970 | Eggert et al. | 33/203.16 |
| 4,285,136 | 8/1978 | Ragan | 33/288 |

Primary Examiner—Willis Little
Attorney, Agent, or Firm—Edwin E. Greigg

[57] ABSTRACT

An auxiliary device which is secured to the wheel and body of a racing vehicle to determine whether or not the body suspension is adjusted properly.

8 Claims, 1 Drawing Figure

U.S. Patent  Nov. 22, 1983  4,416,064
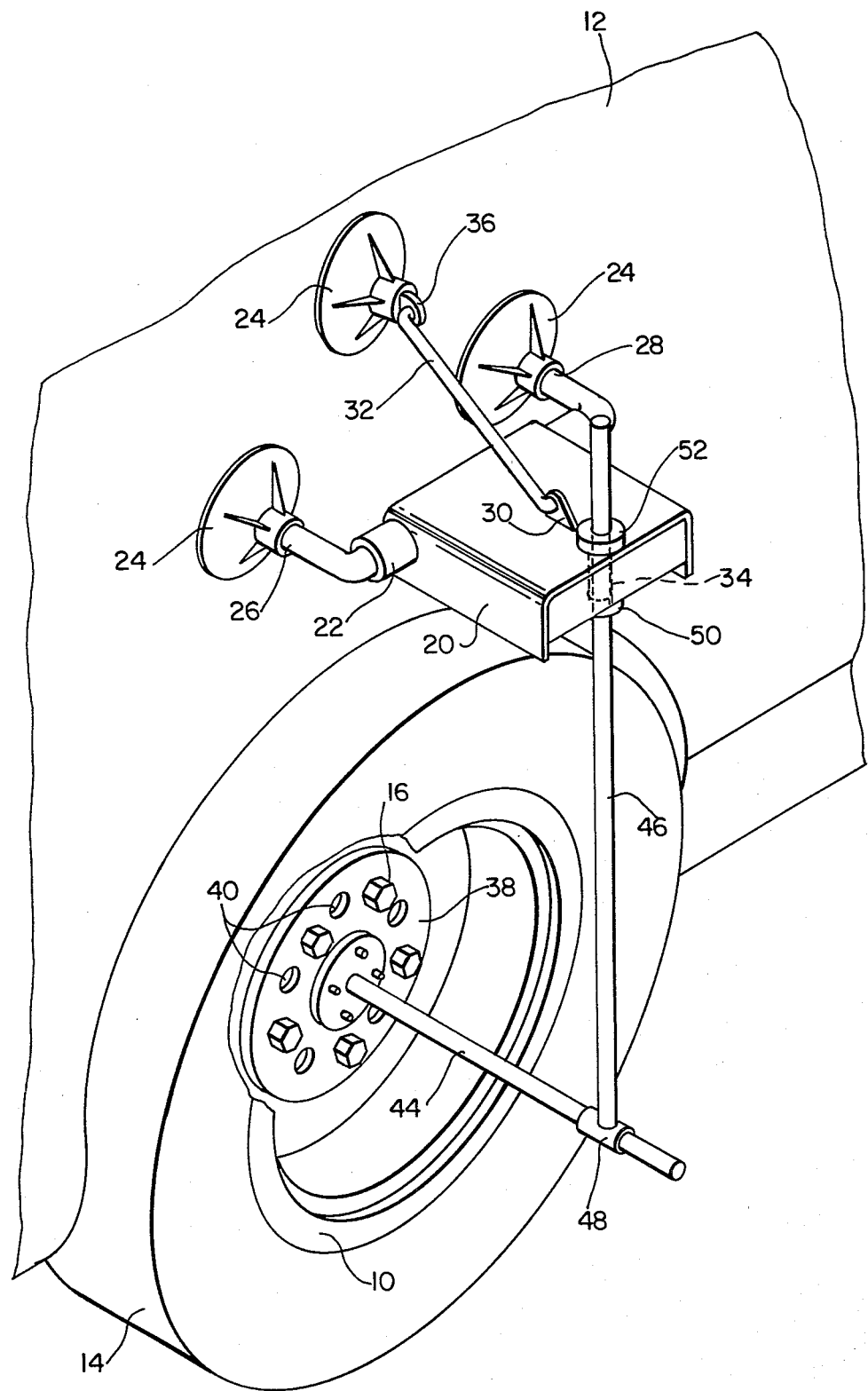

LADDER BAR DIAL

BACKGROUND OF THE INVENTION

This invention relates to improvements in an auxiliary device which is secured to a racing vehicle equipped with ladder bars or with a "four link rear suspension" for determining rear suspension adjustment needs of such vehicles. It is already well-known by those who are skilled in "drag" racing vehicles that the torque from the rear axle is transferred from the housing of the rear axle to the chassis of the vehicle by means of the ladder bars pushing the vehicle forward.

The use of ladder bars or other suspension means on "drag" racers is well known as is the fact that ladder bars are attached at one end to the rear axle on opposite sides of the drive line and at their front ends; these ladder bars are pivotally secured to the frame of the racer. It is customary in ladder bars to provide adjustment thereof and thus this adjustability feature does not form a part of this invention. However, the improvements revealed herein do enable an operator of a "drag" racing wehicle to determine if his vehicle is stabilized for operating at its peak performance and if not, a simple adjustment of each ladder bar in the correct direction may be made from the information determined by the device revealed herein.

OBJECTS AND SUMMARY OF THE INVENTION

Accordingly, an object of the invention is to mount on a racing vehicle equipped with ladder bars, four link rear suspension, or any other type of suspension, a simplified auxiliary measuring device which can be used to determine whether the body of the vehicle is properly stabilized for peak performance of the racer or whether the ladder bars must be adjusted to achieve such a condition.

Another object of the invention is to secure a simple, easily-mounted auxiliary device which is mounted to the lug bolt area of one of the rear wheels and also secured to a portion of the body in order to determine whether the body of a racing vehicle is properly stabilized.

The invention will be better understood and further objects and advantages thereof will become more apparent from the ensuing detailed description of a preferred embodiment taken in conjunction with the drawing.

BRIEF DESCRIPTION OF THE DRAWING

The drawing is a perspective view of the rear end of one side of a "drag" racer showing the new device which comprises this invention attached to parts of the body and to one wheel.

DESCRIPTION OF THE PREFERRED EMBODIMENT

Turning at this time to the drawing, there is shown the left rear wheel 10 and a fender or body portion 12 arranged to extend thereover. The wheel 10 is provided with a tire and a hub with lug bolts 16.

The auxiliary device is shown secured to the fender of a vehicle by use of suction cups 24 of the type used for securing a car top carrier to the roof of an automobile.

The auxiliary device includes a main body 20 formed of a block of metal which may be square, rectangular, or any other desired shape. The body 20 is provided with a horizontal aperture to which are secured spacers 22, one on each side. The spacers are provided with apertures that match the aperture in the main body. A round rod is passed through the aperture and spacers and then bent at right angles which forms a V-shaped rod which is pivotable relative to the main body. The rod has parallel ends 26 and 28. Each of the ends 26 and 28 are provided with suction cups 24 thereon of the type used for securing a car top carrier to the roof of a vehicle. The upper surface of the main body is provided with an upstanding lug 30 on the center line of the main body that has an aperture through the lug. A rod 32 having a 90° end portion that extends through the lug is secured in place by a cotter pin that passes through a hole in the end portion that passes through the lug. The rod 32 is pivotable with respect to the lug 30 and is provided on the other end with a pivotable connector 36 that is secured to a suction cup 24. The main body is also provided with an aperture perpendicular to the body near the outer end opposite from the parallel aperture. The main body can be adjusted by use of the suction cups so that the main body is in a horizontal plane.

In the drawing, there is shown a disc 38 provided with spaced holes 40. The disc 38 is secured over the lug bolt area by the lug bolts 16. An elongated rod is secured to the axial center of the disc and effectively forms an elongation of the center line of the laterally extending drive axle portions of which extend outwardly to the rearwheels. The rod 44 may be fastened to the disc 38 in any sitable manner such as by screw threads, welding, etc. and may be removale therefrom for compact storage.

A round rod 46 extends upwardly in a vertical direction and passes through the vertical aperture 34 in the main body. The lower end of rod 46 is provided with a bearing-coupling 48 that slides over the end of rod 44 and which is pivotable about rod 44 and serves as a bearing during rotation of rod 44 and the wheel. Locators 50 and 52 are provided on opposite sides of the main body and fit the rod with a frictional fit so that the locators will remain on the rod at any place along the length of the rod. The locators may be made of plastic or any other material so long as they are sturdy and can be moved relative to rod 46 and yet remain in the place to which they have been moved after the test has been run.

In use of the auxiliary device to determine whether the ladder bar or other type suspensions are set correctly for peak performance, the device is affixed to the body by the suction cups and to one wheel by the disc. In affixing the device to the vehicle, the disc 38 is secured to the wheel by use of the lugs 16. The disc and rod 44 are secured together so that the rod is on center with the wheel and the rod extends out from the wheel horizontally, and perpendicular to the plane of the wheel. The bearing coupling 48 on the end of rod 46 is slid over the end of the rod 44 and the rod 46 is extended through the vertical aperture 34 through the main body 20. The locator 50 should be on the rod 46 below the main body. The main body is positioned in a horizontal plane so that the rod 46 is in a vertical direction and the main body is in a position so that the suction cups 24 on the U-shaped rod can be secured to the body above the wheel. The upper rod 32 to which the suction cup 24 is affixed can be used for fine adjustment of the main body of the device to ensure that the main body is in a horizontal plane before the upper rod 32 and suction cup 24 are affixed to the body. Once the main body 20 and rod 44 are in horizontal planes and the rod 46 is in the vertical with the racer vehicle stationary, locators 50 and 52 are moved along the rod 46 until the locators rest along-side the horizontal surfaces of the main body. The device is now mounted for a test. In order to determine whether or not the main body is in a horizontal plane, level bubbles may be added to the main body 20 for a more accurate determination.

The auxiliary device could be affixed to the vehicle by setting the main body in place, with the rod 46 in the vertical over the center line of the wheel, then the rod 44 could be secured to the wheel.

The locators 50 and 52, as explained, are slidably and frictionally supported on the rod 46. These locators 50, 52 are provided with an aperture extending axially thereof which conforms exactly to the exterior wall of the rod 46. Since the elements 50, 52 are frictionally slidable on the bar 46, they must fit snugly enough so that they will not be movable inadvertently but only by reason of a torque applied to the rear wheels of the "drag" racer when it is under acceleration.

During a test with the auxiliary device in place, it is believed that those skilled in the art will understand that when the "drag" racer is placed under sudden acceleration, the body thereof will either rise or lower depending upon the extent to which the ladder bars have been previously adjusted. Thus, if the body of the "drag" racer rises, the location 52 above the main body 20 of the auxiliary device will be caused to move upwardly by reason of the main body moving upwardly, which moves the locator upwardly. On the other hand, if the body of the "drag" racer moves in the downward direction, the lower locator 50 will be engaged by the main body 20, and the locator 50 will be moved downwardly as the body moves downwardly.

Accordingly, with the benefit of the information derived from the auxiliary device described herein, a mechanic or a driver of the "drag" racer, to which the device is attached, can determine that the ladder bar is improperly set and thereafter adjust the ladder bar to a proper setting at which the vehicle will be stabilized for peak performance.

The "ladder bar" auxiliary device only indicates if the ladder bar is effectually too long or too short. The use on a particular vehicle depends on the owner's intention. If the car has vertical adjustments for the ladder bar that is already on the car, the owner may only adjust the ladder bar to its limit vertically. Further adjustments may include a longer or shorter bar, if the problem is severe (user's judgment). The only way the ladder bar auxiliary device can be used is to mount the device on the vehicle, test the vehicle, make adjustments, test again, repeat until minimum movement is encountered or, in fact, no movement, which is ideal. The auxiliary device does not indicate exactly how much to adjust the ladder bar; it indicates that the ladder bar is not ideally set.

Obviously, the main body of the ladder bar auxiliary device can be affixed to the body and wheel by other means. For instance, the main body could be secured to the edge of the body or fender well by use of a clamp or any other means. The important feature is that the main body of the auxiliary device be in a horizontal plane, that the rod be affixed to the wheel on the center line, and that the vertical rod be in the vertical direction. The rod 44 can be screw threaded, welded, or affixed to the disc by any desired means so long as the rod 44 will be on the center line of the wheel and extending out in a horizontal plane.

The foregoing relates to a preferred exemplary embodiment of the invention, it being understood that other emodiments and variants thereof are possible within the spirit and scope of the invention, the latter being defined by the appended claims.

What is claimed and desired to be secured by Letters Patent of the United States is:

1. An auxiliary device for determining a requirement for rear suspension adjustments of a racing vehicle comprising a main body, means for mounting said main body to a body portion of said racing vehicle, with said main body in substantially a horizontal plane, a first rod means for securing said first rod on the center line of a wheel with said first rod substantially perpendicular to a vertical plane through said wheel, a second rod, a bearing-coupling on one end of said second rod, said bearing-coupling adapted to be placed over and along said first rod, said second rod having sufficient length to extend through an aperture in said main body when in use, and a pair of locator means, said pair of locator means having an axial aperture which will slip over said second rod with a frictional fit.

2. An auxiliary device as claimed in claim 1 in which a first loator of said pair of locators is adapted to fit over said second rod below said main body, and a second locator of said pair of locators is adapted to fit over said second rod above said main body.

3. An auxiliary device as claimed in claim 1 wherein said means for securing said first rod to said wheel is a disc, said disc including a plurality of holes therein by which said disc and rod may be secured to the wheel by lug bolts.

4. An auxiliary device as claimed in claim 1 wherein said means for securing said main body to said body portion of said vehicle includes suction cups on pivotable rods mounted on said main body.

5. An auxiliary device as claimed in claim 4 wherein said means for securing said first rod to said wheel is a disc, said disc including a plurality of holes therein by which said disc and rod may be secured to the wheel by lug bolts.

6. An auxiliary device dependent on claim 3, 4 or 5 in which a first locator of said pair of locators is adapted to fit over said second rod below said main body, and a second locator of said pair of locators is adapted to fit over said second rod above said main body.

* * * * *